INVENTOR.
Stuart L. Ridgway

United States Patent Office 3,554,649
Patented Jan. 12, 1971

3,554,649
APPARATUS FOR SLIT ILLUMINATION
Stuart L. Ridgway, Princeton, N.J., assignor to Princeton Applied Research Corporation, Princeton, N.J.
Filed Oct. 28, 1968, Ser. No. 770,954
Int. Cl. G01j 3/18, 3/10, 3/04
U.S. Cl. 356—100            9 Claims

ABSTRACT OF THE DISCLOSURE

Apparatus for illuminating a slit is provided wherein multi-wavelength radiation is caused to impinge sequentially on a plurality of input means. The multi-wavelength radiation emanating therefrom is diffracted and selected wavelength components of the multi-wavelength radiation emanating from each input means is caused to impinge on a single exit slit. The selected wavelength component impinging on the exit slit from each input means being different and the sequential illumination of such exit slit with radiation from each of such input means causing the various selected wavelength components from each input means to be presented to the exit slit in a time multiplex sequence.

---

Figure 1:
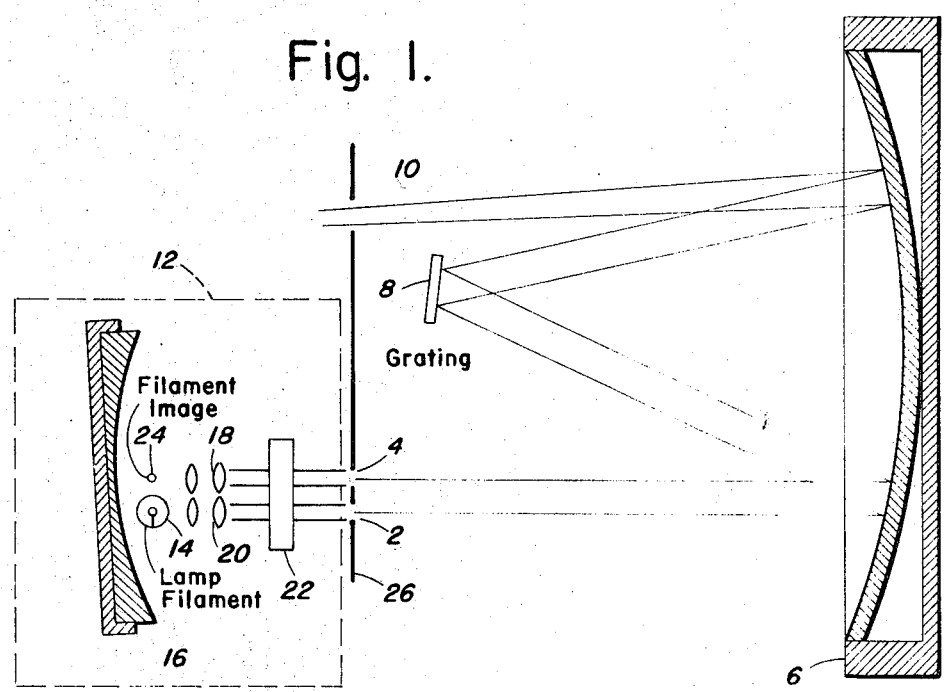

This invention relates to apparatus for illuminating a slit and more particularly to a light radiation input for spectrometers, spectrophotometers, oximeters and the like.

Although this invention is not limited to uses with any particular apparatus or in conjunction with any specified combination, a typical application of one embodiment of this invention may be seen in application Serial No. 771,039, to Spectrophotometer Apparatus, which application was filed on the same date as the instant application, and is assigned to the same assignee thereof.

In present day spectrometers, spectrophotometers, oximeters and similar optical instruments it is often necessary to obtain light radiation of particular wavelengths and precise values in a time multiplex sequence. In addition, it is often critical to the analysis being carried out that the intensity of these particular wavelengths be of large magnitude, virtually identical, and that their time and phase relationships be known so that changes therein induced by the samples under test may be quickly and easily ascertained. The apparatus utilized by the prior art to accomplish the above stated objectives often included complex mechanical arrangements of optical filters, optical attenuating wedges, plural radiation sources together with reflecting and focusing expedients, and many adjusting and calibrating appliances. These complex arrangements often proved to be insufficiently precise for the results sought because man-made optical filters and wedges are often nonuniform. Furthermore, the complexity of these devices made them difficult to calibrate, operate, and maintain as well as making the cost of an individual unit very substantial.

Therefore, it is an object of this invention to provide relatively simple and inexpensive apparatus for illuminating a slit with high intensity radiations of precise, selectable wavelengths of similar intensity, which apparatus does not utilize optical filters, optical attenuating devices, or plural radiation sources. Various other objects and advantages of the invention will become clear from the following detailed description of the embodiments disclosed herein, and the novel features will be particularly pointed out in connection with the appended claims.

Although the term "light" has been used throughout the specification and claims, it will be understood that this term is to include all forms of radiant energy capable of utilization with the described apparatus. Thus the term "light" as used herein will specifically include visible and/or invisible light, as for instance that radiation in the infrared region.

Figure 2:
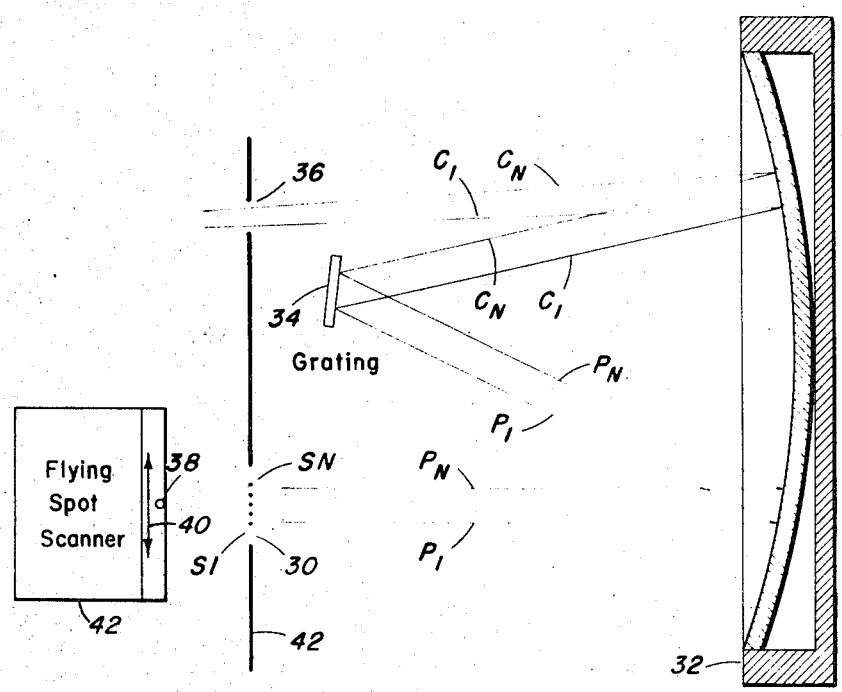

In accordance with the invention, apparatus for illuminating a slit is provided wherein multi-wavelength radiation of similar intensity is caused to sequentially emanate from a plurality of input means, the radiation is then diffracted and selected wavelength components thereof are thereafter caused to impinge upon an exit slit. The invention will be more clearly understood by reference to the following detailed description of several embodiments thereof in conjunction with the accompanying drawings in which:

FIG. 1 is a detailed plan view, partially in section, of a first embodiment of the slit illumination apparatus according to this invention; and FIG. 2 is a detailed view, partially in section, of a second embodiment of the slit illumination apparatus according to the instant invention.

Referring now to the drawings and more particularly to FIG. 1 thereof, there is shown a first embodiment of the apparatus for slit illumination according to the present invention. The apparatus of the FIG. 1 embodiment comprises first and second input slits 2 and 4, a concave reflecting mirror 6, a diffraction grating 8, and an exit slit 10. Although only two input slits have been shown, as will become obvious from the description hereinafter of this embodiment, additional input slits may be provided and generally one input slit should be provided for each of the selected wavelength light pulses desired in the multiplex sequence applied to the exit slit 10.

The input slits 2 and 4 are alternately illuminated with white light having an angular distribution which is sufficient to fill said input slits 2 and 4 by the apparatus enclosed within the dashed lines 12. The apparatus enclosed within block 12 comprises a white light source 14, which may be a tungsten filament lamp, having an appropriate intensity filament therein whose end view is shown; a concave reflecting mirror 16, collimating lens sets 18 and 20, and a chopper 22, which may be a ten slot rotatable disc. The concave mirror 16 forms a real image of the filament of source 14 at a location 24 which location has the same spatial relationship with the lens set 18 and the input slit 4 that the source 14 has with the lens set 20 and the input slit 2. Thus each collimating lens set 18 and 20 sees a virtually identical source, spatially positioned at the identical location with respect to each lens set, and receives radiation of virtually identical intensity.

As a property of the instant apparatus for slit illumination is to image the entrance slit into the exit slit for the particular wavelength(s) of light that the apparatus is designed to pass, the direct imaging of the light source 14 into the entrance slits and subsequently to the output slit would create, due to the varying intensity portions of the light source 14, some portions of each of said slits to be brightly lit while others would be dimly lit. To avoid this undesirable feature, collimating lens sets 20 and 18 are placed close to each slit and the focal point of each lens set 20 or 18 is placed at its respective light source 14 or 14. This arrangement has the desirable effect of transforming the inhomogeneity in the spatial distribution of the light source into an inhomogeneity in the angular distribution of the source whereby the overall light transmission will be uniform as the angular light acceptance of the exit slit 10 is smooth. Thus, this arrangement causes the intensity of the radiation impingent on the entrance and exit slits 2, 4 and 10 to be uniform, and does not penalize the luminosity of the system by more than the reflective losses of the collimating lens sets 20 and 18 which losses can be made very small by suitable non-reflective coatings. The diameter of the collimating lens sets 20 and 18 must be greater than the largest dimension of the entrance slit, and the angular extent of each of the sources 14 and 24 as seen from the center of each of the collimating lens sets 20 and 18 respectively, should be at least as large as the angular acceptance of the output of the apparatus for slit illumination. If these two conditions are met, the output brightness will be as great as if the filamentary light source and the entrance slit coincided.

The chopper 22, when rotating, acts to alternately illuminate each slit with the radiation impingent thereon as described above. Thus, multiplexed light, as hereinafter described, having spacing between information pulses, which may be of approximately one millisecond, is presented to the exit slit 10.

The radiation alternately impingent on each of the input slits 2 and 4 is incident on the concave mirror 6 and is reflected therefrom so as to impinge on the diffraction grating 8. The white light radiation which impinges upon the diffraction grating 8 is diffracted thereby and the thus separated components impinge on the mirror 6. The second reflection from the mirror 6 greatly compensates in the well-known manner, the aberrations introduced by the first reflection therefrom and causes the previous selected component wavelengths to radiate toward the exit slit 10. It should be noted that in FIG. 1 drawing, the light rays shown leaving the diffraction grating 8 are representative of only the selected components, however, it is obvious that all other components from the diffracted white light radiation will impinge on mirror 6 but they will not be reflected therefrom in a path calculated to impinge upon the exit slit 10.

The wavelengths of the selected white light components which, upon the second reflection from the concave mirror 6, radiate toward the exit slit 10, are determined, once the relationship between the exit slit 10, the mirror 6, and the diffraction grating 8 are fixed, by the positioning and the separation between the input slits 2 and 4. The precise positioning of the input slits 2 and 4 may be determined by making use of the well-known physical law that every optical path is readily reversible. Thus, light at the first and second selected wavelengths may be separately utilized to illuminate the exit slit 10 and the position where each respective wavelength impinges upon plate 26 is the position for locating that respective input slit. In a case where the instant embodiment was utilized in conjunction with an oximeter, and standard wavelengths of 805 m$\mu$ and 660 m$\mu$ were utilized, the separation between the input slits was found to be approximately 0.3 inch.

In operation, the apparatus shown in the FIG. 1 embodiment is initially adjusted, in the manner explained above, when it is manufactured, so that white light impingent on input slit 2 will produce a first radiation component of a selected value at the exit slit 10 and white light impingent on input slit 4, will produce a second radiation component of a selected value at said exit slit 10. Once these adjustments are initially made by the manufacturer, the apparatus will not need further adjustment unless it is desired to change the selected wavelength radiation components present at the exit slit. When this apparatus is then energized, the mirror 16 will form a real image of the filament of the tungsten lamp 14 at the position 24. The collimating lens sets 18 and 20, acting in the previously described manner, will transmit this radiation to the input slits 4 and 2, respectively, when the chopper 22 is in the proper relationship therewith. The chopper 22, as previously stated, may be a ten slot disc and is preferably rotated at an angular speed which is sufficiently high to maintain relatively short pulse durations having a one millisecond time separation between the pulses of radiation which are thereafter transmitted to the exit slit 10 so that noise and cross-talk is kept at a minimum level. Thus, the apparatus enclosed within the block 12 in FIG. 1 will alternately illuminate input slits 2 and 4 with white light radiation of equal quisite angular distribution so that each slit, when illuminated, is illuminated uniformly across its entire area.

intensity and having, as previously mentioned, the re-

The radiation alternately impinging on the input slits 2 and 4, as shown by the radiation path illustrated in FIG. 1, is incident on the concave mirror 16 and is reflected therefrom onto the diffraction grating 8. The white light radiation alternately radiating from input slits 2 and 4 and thus alternately impinging on the diffraction grating 8 are thereby separated into their spectral components which diffract from the diffraction grating 8 onto the concave mirror 6. As previously stated, only the selected components of interest are shown radiating from the diffraction grating 8 to the concave mirror 6 and from the mirror 6 to the exit slit 10. The second reflection of the light radiations from the mirror 6 compensates the most significant optical aberrations introduced into said radiation by the first reflection from the concave mirror 6 and thus no further aberration corrections are necessary in the presently disclosed apparatus. The first and second selected components are thus alternately reflected from the concave mirror 6 and radiate toward the exit slit 10. The remainder of the separated components which reflect from the concave mirror 6, will not impinge upon the exit slit 10 and thus only first and second selected wavelength radiation will emanate from the exit slit 10.

Thus, it is seen that the apparatus disclosed in the FIG. 1 embodiment, provides radiation of a first and second discrete and selectable wavelengths to the exit slit 10, which wavelengths are supplied in a time multiplex sequence wherein a pulse train of alternate wavelengths is supplied with a predetermined time interval between adjacent pulses.

The apparatus shown in the FIG. 2 embodiment of the present invention, includes an input aperture 30, a concave reflecting mirror 32, a diffraction grating 34, and an exit slit 36. Discrete portions of the input aperture 30 are illuminated by a source of white light radiation 38, which preferably approaches a point source. The source of white light radiation 38 is movable in the directions indicated by the arrow 40 so that discrete portions of the input aperture 30 sequentially have white light radiation passing therethrough. The source of white light radiation 38 can be conveniently supplied by a flying spot scanner or similar devices which are well known in the art. In addition, various lens configurations may be utilized to modify the radiation from the source 38 as well as to adjust the angular distribution thereof as was described with regard to FIG. 1.

The radiation passing through the various discrete portions of the input aperture 30 impinge upon the concave reflecting mirror 32. The mirror 32, the diffraction grating 34 and the exit slit 36 each may be identical to the corresponding apparatus described with regard to FIG. 1 and each has the same function which will not be here repeated.

The FIG. 2 embodiment of the instant invention is utilized when it is desired to obtain a multiplex sequence of discrete wavelength radiation of a first and second selected wavelength and each spectral component therebetween. Thus, one discrete wavelength component is produced for each portion of the input aperture which is illuminated and the inclusive range of this multiplex sequence is determined by amplitude of motion of the variable position source 38 produced for instance by a flying spot scanner 42 or the like. The mode of operation of the FIG. 2 embodiment will be described wherein the inclusive range of the wavelengths included in the multiplex radiation sequence presented to the exit slit 36 is from 500 m$\mu$ to 900 m$\mu$; however, it should be clear from the description hereinafter presented, that any range is available.

With the relationship between the exit slit 36, the diffraction grating 34, and the concave reflecting mirror 32 fixed, the input aperture 30 is covered with an opaque substance having convenient graduations thereon. The system is then adjusted by passing the selected wavelength radiation components representing the extremes of the selected range individually through the exit slit 36 so that they will pass inversely through the normal light path, as specified with regard to the FIG. 1 embodiment, and impinge upon the opaque substance and the graduations thereon. With these points of impingement noted, the flying spot scanner 42 is adjusted so that the maximum and minimum portions of the source of radiation 38 will separately and individually illuminate the noted points of impingement respectively. Preferably, such adjustments are performed at the place of manufacture and the flying spot scanner 42 is then calibrated so that the selected ranges may thereafter be varied by new dial settings.

Once the apparatus of the FIG. 2 embodiment has thus been properly adjusted and calibrated, the flying spot scanner 42 is energized to thereby produce the source of radiation 38 and to vary the position of the same as indicated by the arrow 40 between the selected maximum and minimum positions. For the purposes of this description, it is assumed that it is desired to obtain discrete wavelength radiation components in a time multiplex sequence wherein the sequence includes the discrete wavelengths between 500 m$\mu$ and 900 m$\mu$. The portions of the input aperture 30 indicated as $S_1$ and $S_N$ are assumed to correspond to the positions at which white light will be diffracted such that a 500 m$\mu$ component and a 900 m$\mu$ component, respectively, will impinge on the exit slit 36. Thus, the energized flying spot scanner 42 produces said source of radiation 38 and varies the position thereof between portions $S_1$ and $S_N$ of the input aperture.

When the source of radiation 38 is in a position opposite portion $S_1$ of the input aperture 30, the white light radiation impingent thereon passes therethrough along the path $P_1$ and is incident on the concave reflecting mirror 32. This white light radiation is reflected from the mirror 32 and continues along the path $P_1$ thereby impinging upon the diffraction grating 34. The diffraction grating 34 acts upon the incident white light radiation to separate said radiation into its spectral components and to diffract such components along a path which will cause them to impinge upon the concave reflecting mirror 32. The separated spectral components impingement on the concave reflecting mirror 32 are reflected therefrom and such second reflection acts to substantially correct said components as to any aberrations introduced into the radiation during the first reflection from said concave reflecting mirror 32 in the well-known manner. Of the various components of the white light radiation reflected from the concave reflecting mirror 32, only the selected component, in this case on having a wavelength of 500 m$\mu$, is inmpingent on the exit slit 36. The remainder of the separated white light components, i.e., those comprising the nonselected components, impinge upon the housing 42 and hence are not present at the output of the exit slit 36. It should be noted that the light path $C_1$, as shown in FIG. 2, indicates the separated component radiation at only the selected wavelength which is thereby shown impinging on the exit slit 36.

When the radiation source 38 is at a position so that the portion of the input aperture annotated $S_N$ is illuminated, the white light radiation passing therethrough will follow the light path annotated $P_N$. This white light radiation will traverse the $P_N$ light path in the manner previously specified with regard to the $S_1$ portion except that the separated component of the white light radiation which will now impinge upon the exit slit 36 will have a wavelength of 900 m$\mu$. The remainder of the separated wavelength components will impinge upon the housing 42 and hence are not present at the output of the exit slit 36. Accordingly, the light path shown as $C_N$ from the diffraction grating 34 to the exit slit 36 is indicative of only the light path of the selected wavelength component which in this case is 900 m$\mu$.

Similarly, when the source of radiation is opposite any of the interim portions of the input aperture between portion $S_1$ and $S_N$, the white light component will follow a similar light path to those mentioned above, however, interim wavelength components will impinge upon the exit slit 36. Thus, if a cycle of the source of radiation 38 is defined in terms of a change in position of the source 38 from a position opposite portion $S_1$ to a position opposite portion $S_N$ and the return to a position opposite portion $S_1$, one frame of the time multiplex sequence of radiation comprising the discrete wavelengths presented at exit slit 36 would include 2N discrete wavelength radiation components having a first and last component of 500 m$\mu$ and a center component of 900 m$\mu$. It should be noted that although this embodiment of the instant invention has been disclosed wherein a band of selected wavelength components are present in a multiplex sequence, if one were interested in obtaining only selected wavelengths therefrom after said wavelengths had been transduced into electrical signals, a waveform eductor such as the Princeton Applied Research Corp., Model TDH–9, could be used therewith to selectively extract the components of interest.

Thus, the apparatus disclosed in the FIG. 2 embodiment of the instant invention provides radiation between a first and a second discrete selectable wavelength to an exit 36 which wavelengths are supplied in a time multiplex sequence as separate and distinct light pulses.

It will thus be seen that the instant invention provides apparatus for producing light radiation of particular wavelengths, having precise values, which radiations are identical in intensity, large in magnitude and of known time and phase relationship. Furthermore, the present invention provides such apparatus without the need for complex mechanical arrangements, optical filterings or attenuating expedients, or the pluralities of radiation sources with their inherent disadvantages.

While the invention has been described in connection with two specific embodiments thereof, it will be understood that many modifications will be readily apparent to one of ordinary skill in the art; and that this application is intended to cover any adaptations or variations therefore, it is manifestly intended that this invention be only limited by the claims and the equivalents thereof.

What is claimed is:
1. Apparatus for slit illumination comprising:
   means for providing at least first and second slits;
   a source of radiation in light communication with said first slit and having a fixed spatial relationship therewith appropriate for illuminating said first slit;
   image forming means for forming a real image of said source of radiation, upon the energization thereof, at a location in light communication with said second slit, said real image location having the same spatial relationship with respect to said second slit that said source of radiation has with respect to said first slit;
   collimating means positioned between said first and second slits and said source of radiation and the image thereof, respectively, said collimating means modifying the angular distribution of said radiation and impinging said radiation upon said slits, said collimating means positioned between said first slit and said source of radiation having a focal point substantially at said source of radiation and said collimating means positioned between said second slit and said real image of said source of radiation having a focal point substantially at the location of the real image associated therewith; and chopper means present in a light path between said source of radiation and said image and said first and second slits, said chopper means alternatively passing radiation from said source of radiation to said first slit and from said real image to said second slit.

2. Apparatus for illuminating a slit comprising:

means for providing first and second slits;

a source of radiation in light communication with said first slit and having a fixed spatial relationship therewith;

image forming means for forming a real image of said source of radiation, upon the energization thereof, at a location in light communication with said second slit, said real image location having the same spatial relationship with said second slit that said source of radiation has with said first slit;

collimating means positioned between said first and second slits and said source of radiation and the image thereof, respectively, said collimating means modifying the angular distribution of said radiation and impinging said radiation upon said slit;

chopper means present in a light path between said source of radiation and said image and said first and second slits, said chopper means acting, when energized, to alternatively pass radiation from said source of radiation to said first slit and from said real image to said second slit;

an exit slit; and means to cause radiation emanating from said first and second slits to impinge upon said exit slit, said last-named means including a reflecting surface and diffraction grating means, said reflecting surface present in a light path between said diffraction grating means and exit slit, said reflecting surface acting to correct any aberrations introduced thereby to radiation traversing the light path between said first and second slits and the diffraction grating means as said radiation traverses the light path between said diffraction grating means and said exit slit.

3. The apparatus of claim 2 wherein said first and second slits and said diffraction grating means have a fixed optical relationship so that selected components of the radiation which emanate from each of said first and second slits will be reflected from said diffraction grating means and impinge upon said exit slit, said first and second slits having a predetermined spacing therebetween which spacing is calculated to insure that the selected components of radiation from said first slit will comprise radiation of a first wavelength and said selected components of radiation from said second slit will comprise radiation of a second wavelength different from said first wavelength.

4. Apparatus for illuminating a slit with discrete wavelength radiation comprising:

means providing a plurality of input slits;

a source of multi-wavelength radiation in light communication with one of said input slits;

radiation imaging means for forming a real image of said source of radiation, upon the energization thereof, at locations in light communication with each of the other of said plurality of input slits, said radiation imaging means forming one real image for each of said other input slits of said plurality, each real image of said source of radiation formed having the same spatial relationship with respect to the input slit associated therewith as exhibited by said source of radiation with respect to said one input slit;

collimating means positioned between said one input slit and said source of radiation and positioned between each of the other of said plurality of input slits and its respective real image of said source of radiation;

means providing an exit slit; and, diffraction grating means optically interposed between said input slits and said exit slit, said input slits and said diffraction grating means having a fixed optical relationship so that selected components of said multi-wavelength radiation which impinge on each input slit will be diffracted from said diffraction grating means and impinge upon said exit slit, said plurality of input slits having a predetermined spacing between adjacent slits which spacing is calculated to insure that selected components of radiation from each of said plurality of input slits which impinge upon said exit slit will comprise radiation of substantially only a selected wavelength, said selected wavelength being of a different value for each slit of said plurality.

5. The apparatus according to claim 4 additionally comprising chopper means positioned between said plurality of input slits and said collimating means, said chopper means acting when energized to illuminate said plurality of input slits in an alternating sequence.

6. The apparatus according to claim 5 wherein said collimating means positioned between said one input slit and said source of radiation has a focal point substantially at said source of radiation and said collimating means positioned between each of the other of said plurality of input slits and their respective real image of said source of radiation has a focal point substantially at the real image associated therewith.

7. The apparatus of claim 6 additionally comprising refleciton means positioned in a light path between said plurality of input slits and said diffraction grating means, said reflection means additionally positioned in a light path between said diffraction grating means and said exit slit, said reflection means acting upon radiation incident thereon, during a second reflection therefrom toward said exit slit to substantially correct any aberrations present in said radiation introduced by said reflection means during a first reflection therefrom.

8. The apparatus according to claim 7 wherein said reflection means comprises a single, unitary reflecting surface said single, unitary reflecting surface being present in both said light path between said input slits and said diffraction grating means and said light path between said diffraction grating means and said exit slit.

9. Apparatus for illuminating a slit with discrete wavelength radiation comprising:

a plurality of light input means;

a source of multi-wavelength radiation in light communication with one of said input means;

radiation imaging means for forming a real image of said source of radiation, upon the energization thereof, at locations in light communication with each of the other of said plurality of input means, said radiation imaging means forming one real image for each of said other input means of said plurality, each real image of said source of radiation formed having the same spatial relationship with respect to the input means associated therewith as exhibited by said source of radiation with respect to said one input means;

collimating means positioned between said one input means and said source of radiation and positioned between each of the other of said plurality of input means and their respective real image of said source of radiation;

means providing an exit slit;

diffraction grating means optically interposed between said input means and said exit slit, said input means and said diffraction grating means having a fixed optical relationship so that selected components of said multi-wavelength radiation which impinge on each of said plurality of input means will be diffracted from said diffraction grating means and impinge upon said exit slit, said plurality of input means having a predetermined spacing between adjacent ones of said means which spacing is calculated to insure that selected components of radiation from each of said plurality of input means which impinges upon said exit slit will comprise radiation of substantially only a selected wavelength, said selected wavelength being of a different value for each input means of said plurality; and, a reflecting surface present in a light path between said plurality of light input means and said diffraction grating means and additionally present in a light path between said diffraction grating means and said exit slit, said reflecting surface acting upon radiation incident thereon, during a second reflection therefrom toward said exit slit to substantially correct any aberrations present in said radiation introduced by said reflecting surface during a first reflection therefrom.

References Cited

UNITED STATES PATENTS

| | | | |
|---|---|---|---|
| 2,823,577 | 2/1958 | Machler | 356—82 |
| 2,941,443 | 6/1960 | McNally | 356—100 |
| 3,218,914 | 11/1965 | Bartz et al. | 356—97 |
| 3,279,308 | 10/1966 | Bartz et al. | 356—51 |

RONALD L. WIBERT, Primary Examiner

F. L. EVANS, Assistant Examiner

U.S. Cl. X.R.

356—51